Patented June 30, 1936

2,045,988

UNITED STATES PATENT OFFICE 2,045,988

ADHESIVE AND PROCESS OF MANUFACTURE THEREOF

Wilbur L. Jones, Yonkers, N. Y., assignor to Demco Library Supplies, Inc., Madison, Wis., a corporation of Wisconsin No Drawing. Application October 1, 1934, Serial No. 746,411

2 Claims. (Cl. 134—23.4)

This invention relates to improvements in adhesives and processes of manufacture thereof.

It is the primary object of the invention to provide a concentrated adhesive composition which is fluid when cold, is freely miscible with water, and which when mixed with water produces a solution which is free flowing and non-thickening, and which, whether concentrated or diluted, is capable of giving a strong durable bond such as is required in bookbinding and book mending.

In the repair of worn and damaged books in a library or the like, there are different mending operations, and each of these may require an adhesive solution of a different degree of fluidity. As a rule, in library mending practice, a single, concentrated adhesive is the source of all such solutions; hence it is important that this concentrated, or primary, adhesive should be one that can be converted with ease into the less concentrated solutions used in some of the mending operations.

To illustrate how different library duties call for different mixtures of the primary adhesive, I cite the following two instances: When a piece of gummed binders' cloth is applied to the cover boards in order to provide a new back for the book, the gummed side of the binders' cloth is treated with a highly fluid (almost a watery) solution, because the gum coating, when properly moistened, furnishes nearly all the adhesive effect which is needed On the other hand, when paper, ungummed cloth or any other fabric lacking a gum coat or the equivalent, has to be attached to the book in the process of mending, a stronger (that is, a more concentrated) solution of the primary adhesive must be used Thus, for different duties and for gluing different types and weights of fabric, the primary adhesive should be adjusted or diluted by adding different amounts of cold water; and it is essential that all these solutions of the primary adhesive be perfectly smooth and highly fluid so that that they can be spread with ease and speed. At the same time, in spite of the varying degrees of dilution that may be used, these adhesive solutions must be capable of producing a strong, durable bond—in fact, a bond capable of lasting as long as the materials bound together.

To meet these requirements there is needed an adhesive which is at once concentrated and fluid. Since this primary adhesive will be diluted with various amounts of water according to the librarian's judgment, fluidity in the primary adhesive is indispensable, because fluids can be measured by volume, whereas pastes, being solid and usually irregular as to shape, would have to be weighed for accurate proportioning with water. An even more important reason for using a fluid concentrated adhesive is this: the solid pastes cannot be thinned satisfactorily with cold water.

Ordinary dextrin pastes, for example, do not mix readily with cold water if they are at all concentrated. They form lumps which can be dissolved only by cooking. Moreover, they undergo a chemical or physical change which is not due merely to the evaporation of water, but occurs even in a tightly closed container and is attributed by some modern colloidal chemists to a phenomenon akin to crystallization.

In order to prepare a dextrin adhesive which is at once concentrated and fluid (when cold) it is necessary to destroy the hardening or crystallizing properties of the dextrin. I am aware that a drastic heat treatment with strong acid or alkali or oxidizing agent has the effect of destroying the hardening properties of dextrin by decomposing it into glucose or some other sugar, but such treatment results in a serious impairment in the adhesive properties of the dextrin, and dextrins modified by acids, alkalis or oxidizing agents and dextrins mixed with glucose or other sugars are not the subject of my invention.

I have found that if a corn dextrin, (preferably that corn dextrin known in the trade as Flaxo), is treated with a lesser amount (for example approximately one half its weight) of anhydrous calcium chloride, suspended in water and quickly heated to a temperature of 85 degrees centigrade, and then promptly cooled, the hardening or crystallizing properties of the said corn dextrin will be found to have been destroyed, so that the corn dextrin will be fluid. It will remain fluid in spite of aging, and its adhesive properties, instead of being impaired, will be found to have been materially improved. Moreover, corn dextrin, treated as I have described, has the property of being miscible with any quantity of cold water and of giving dilute solutions of practically constant fluidity and great adhesive strength.

I am not concerned with the solid pastes or rigid jellies which are said to be formed when dextrin is saturated with a salt, such as a chloride. What I have invented and claim as novel is a dextrin solution which though concentrated is fluid, which remains fluid and tacky in spite of aging, which is freely miscible with cold water, and in which the quality of the dextrin is unimpaired, as is proved by its excellent adhesive strength and durability.

A formula which illustrates my invention in a preferred form is the following:

| | Parts |
|---|---|
| Calcium chloride (anhydrous) | 12 |
| "Flaxo" corn dextrin | 25 |
| Water | 40 |

In connection with the above formula I may add a preservative, such as a phenol or phenolic derivative, with or without an essential oil, or I may add the essential oil alone. The hereinbefore named ingredients and their proportions can be varied to some extent without departing from what I regard as my invention.

I claim:

1. The process of manufacturing adhesive which comprises the suspension in water of a mixture of corn dextrin with approximately one half its weight of anhydrous calcium chloride, raising the temperature of the suspension quickly to the neighborhood of 85° C. to bring it into solution, and promptly cooling the solution whereby to provide a substantially permanently fluid concentrated solution.

2. A substantially permanently fluid, concentrated, water-miscible adhesive consisting of an aqueous solution of corn dextrin and approximately one-half its weight of anhydrous calcium chloride.

WILBUR L. JONES.